US009400996B2

(12) United States Patent
Latin-Stoermer et al.

(10) Patent No.: US 9,400,996 B2
(45) Date of Patent: Jul. 26, 2016

(54) METHODS AND SYSTEMS FOR SELECTING AN IMAGE IN A NETWORK ENVIRONMENT

(71) Applicant: Amazon Technologies, Inc., Reno, NV (US)

(72) Inventors: Toby R. Latin-Stoermer, Seattle, WA (US); Abhoy Bhaktwatsalam, Kirkland, WA (US); Randy C. Chung, Seattle, WA (US); Chi Ming Kan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/311,833

(22) Filed: Jun. 23, 2014

(65) Prior Publication Data

US 2015/0016727 A1  Jan. 15, 2015

Related U.S. Application Data

(63) Continuation of application No. 12/973,841, filed on Dec. 20, 2010, now Pat. No. 8,762,218, which is a continuation of application No. 11/617,967, filed on Dec. 29, 2006, now Pat. No. 7,856,380.

(51) Int. Cl.
*G06F 17/30* (2006.01)
*G06K 9/62* (2006.01)
*G06T 7/00* (2006.01)
*G06Q 30/06* (2012.01)

(52) U.S. Cl.
CPC ...... *G06Q 30/0643* (2013.01); *G06F 17/30256* (2013.01); *G06K 9/6202* (2013.01); *G06Q 30/0633* (2013.01); *G06T 7/0002* (2013.01); *Y10S 707/948* (2013.01); *Y10S 707/962* (2013.01)

(58) Field of Classification Search
None
See application file for complete search history.

(56) References Cited

U.S. PATENT DOCUMENTS

| | | |
|---|---|---|
| 5,749,081 A | 5/1998 | Whiteis |
| 6,064,980 A | 5/2000 | Jacobi et al. |
| 6,115,717 A | 9/2000 | Mehrotra et al. |
| 6,185,558 B1 | 2/2001 | Bowman |
| 6,266,649 B1 | 7/2001 | Linden et al. |
| 6,317,722 B1 | 11/2001 | Jacobi et al. |
| 6,353,823 B1 * | 3/2002 | Kumar ............. G06F 17/30067 |
| 6,366,910 B1 | 4/2002 | Rajaraman et al. |

(Continued)

OTHER PUBLICATIONS

Gevers, Th, and A. W. M. Smeulders. "Image search engines: An overview." Emerging Topics in Computer Vision (2004): 1-54.*

(Continued)

*Primary Examiner* — Kim Vu
*Assistant Examiner* — Nathan Bloom
(74) *Attorney, Agent, or Firm* — Knobbe, Martens, Olson & Bear, LLP

(57) ABSTRACT

Systems and methods for collecting, selecting, and displaying an image or image set in a network based environment are described. The systems and methods can collect multiple images for any given item from multiple sources, select a desired image (or set of images) that best depicts that item, and then display that selected image (or image set) in the network based environment. The desired image (or image set) that best depicts the item can be selected using any number or combination of pre-selected criteria. By using the pre-selected criteria, the process needs no manual intervention, and can therefore be automated or semi-automated to save both time and cost.

20 Claims, 8 Drawing Sheets

(56) References Cited

U.S. PATENT DOCUMENTS

| | | |
|---|---|---|
| 6,446,061 B1 | 9/2002 | Doerre et al. |
| 6,615,226 B1 | 9/2003 | Hartman et al. |
| 6,731,309 B1 | 5/2004 | Unbedacht et al. |
| 6,785,671 B1 | 8/2004 | Bailey et al. |
| 6,853,982 B2 | 2/2005 | Smith et al. |
| 6,912,505 B2 | 6/2005 | Linden et al. |
| 6,963,848 B1 | 11/2005 | Brinkerhoff |
| 7,016,865 B1 | 3/2006 | Weber et al. |
| 7,050,992 B1 | 5/2006 | Bowman et al. |
| 7,113,917 B2 | 9/2006 | Jacobi et al. |
| 7,127,414 B1 | 10/2006 | Awadallah et al. |
| 7,181,419 B1 | 2/2007 | Mesaros |
| 7,203,675 B1 | 4/2007 | Papierniak et al. |
| 7,266,514 B2 | 9/2007 | Herbert et al. |
| 7,305,355 B2 | 12/2007 | Tarvydas et al. |
| 7,331,038 B1 | 2/2008 | Snodgrass et al. |
| 7,460,735 B1 | 12/2008 | Rowley et al. |
| 7,856,380 B1 | 12/2010 | Latin-Stoermer et al. |
| 7,945,484 B1 | 5/2011 | Tam et al. |
| 7,961,938 B1 | 6/2011 | Remedios |
| 8,090,222 B1* | 1/2012 | Baluja et al. .................. 382/305 |
| 8,103,742 B1 | 1/2012 | Green |
| 8,429,539 B1 | 4/2013 | Callies et al. |
| 8,700,490 B1 | 4/2014 | Bhaktwatsalam et al. |
| 8,762,218 B1 | 6/2014 | Latin-Stoermer et al. |
| 2002/0010639 A1 | 1/2002 | Howey et al. |
| 2002/0038255 A1 | 3/2002 | Tarvydas et al. |
| 2002/0111877 A1* | 8/2002 | Nelson ................... G06Q 10/06 705/26.62 |
| 2002/0168108 A1* | 11/2002 | Loui et al. ...................... 382/190 |
| 2003/0147555 A1* | 8/2003 | Bober et al. .................. 382/190 |
| 2003/0158923 A1 | 8/2003 | Burkhart |
| 2003/0217052 A1* | 11/2003 | Rubenczyk ....... G06F 17/30643 |
| 2004/0068449 A1 | 4/2004 | Suzuki et al. |
| 2004/0143600 A1 | 7/2004 | Musgrove et al. |
| 2004/0193591 A1 | 9/2004 | Winter |
| 2005/0071242 A1 | 3/2005 | Allen et al. |
| 2006/0031123 A1 | 2/2006 | Leggett et al. |
| 2006/0059062 A1 | 3/2006 | Wood et al. |
| 2006/0218052 A1* | 9/2006 | Haynes ................... G06Q 30/06 705/26.61 |
| 2007/0073592 A1* | 3/2007 | Perry ................. G06Q 30/0603 705/26.1 |
| 2007/0078850 A1* | 4/2007 | Aziz et al. ......................... 707/6 |
| 2007/0168391 A1 | 7/2007 | Coschigano et al. |
| 2007/0168517 A1 | 7/2007 | Weller |
| 2007/0288514 A1* | 12/2007 | Reitter .............. G06F 17/30864 |
| 2008/0033841 A1* | 2/2008 | Wanker .................. G06Q 30/02 705/7.32 |
| 2008/0033939 A1* | 2/2008 | Khandelwal ...... G06F 17/30867 |
| 2008/0069480 A1* | 3/2008 | Aarabi et al. .................. 382/305 |
| 2008/0109327 A1* | 5/2008 | Mayle ................ G06Q 30/0641 705/27.1 |
| 2008/0113658 A1* | 5/2008 | Bloebaum ............... H04W 4/02 455/418 |
| 2008/0154747 A1* | 6/2008 | Tarbell et al. ................... 705/27 |
| 2008/0177639 A1 | 7/2008 | Kuppersmith et al. |
| 2008/0177640 A1* | 7/2008 | Gokturk ................. G06Q 30/02 705/26.62 |
| 2009/0007012 A1 | 1/2009 | Mandic |
| 2013/0080447 A1* | 3/2013 | Ramer .............. G06F 17/30867 707/748 |
| 2013/0198650 A1 | 8/2013 | Callies et al. |
| 2014/0222626 A1 | 8/2014 | Bhaktwatsalam et al. |

OTHER PUBLICATIONS

Endless.com, Endless Shoes & Handbags, http://www.endless.com (accessed Jan. 1, 2009), copyright 2006-2009, 3 pages.
Quan et al., "A Product-Form Aesthetic Evaluation System," Computer-Aided Industrial Design and Conceptual Design, Nov. 2006, vol. CAIDCD '06, pp. 1-6, and 17-19.
Jul. 2006—http://web.archive.org/web/20060712105423/http://docs.smallbusiness.miva.com/en-US/merchant/4/webhelp/create_attribute_templates.htm.
Website for Gap Inc.—http/www.gap.com—Retrieved Dec. 19, 2010.
Green, Deferred and Off-Loaded Rendering of Selected Portions of Web Pages to Incorporate Late-Arriving Service Data, U.S. Appl. No. 10/720,712, filed Nov. 24, 2003.
Kaick, O.V.; Mori, G. Automatic classification of outdoor images by region matching. In Proceedings of the 3rd Canadian Conference on Computer and Robot Vision (CRV'06), Quebec, Canada, Jun. 7-9, 2006; p. 9.

* cited by examiner

METHODS AND SYSTEMS FOR SELECTING AN IMAGE IN A NETWORK ENVIRONMENT

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

FIELD

This application relates generally to systems and methods for collecting, selecting, and displaying images in a network based environment. In particular, this application relates to systems and methods for selecting a specific image(s) among a collection. of images using preselected criteria and then displaying the selected image in a network based environment.

BACKGROUND

Digital imaging has become increasingly popular, especially in electronic commerce which is increasingly being used by sellers to conduct business and sell items to customers. Customers are able to efficiently view and purchase a wide variety of items, including both goods and services, over computer networks, including the Internet. The same goods and services can be offered by multiple sellers, each with its own description of the item for sale (i.e., including an image), allowing a customer to quickly and easily select any desired item from any given seller by using each seller's image.

The amount of image files being used for such purposes is increasing dramatically. But with the increasing number of image files comes an increasing number of duplicate images, as well as minor variations between different image files meant to identify the same item. Indeed, the minor variations between image files can create apparent duplication of subject matter that is difficult to distinguish when a customer is looking for something specific. In certain instances, the different images (or image sets) for the same item can even be provided by the same source, increasing confusion by the consumer. To avoid that confusion, one option has been to present all images meeting the criteria used to identify the item. This option is distracting and time consuming because the customer must look at every single image in the purchasing process.

Thus, from a customer's perspective, it would be helpful if only a single image (or image set) is displayed since this would simplify the viewing and purchasing process for the customer. In most instances, that single image (or image set) that is displayed to the customer should accurately depict the item. But often the different images (or image sets) are provided by different sellers, and processed by multiple sellers each with their own conditions and criteria, before being displayed to the customer. The different images, not to mention the different conditions and criteria, can further confuse the customer and complicate the purchasing process.

So there exists a problem of how to select a single image that best depicts the item for sale. Most methods address this problem by manually selecting the best image. But it is not unusual in these methods to be confronted with thousands of images. And requiring someone to manually filter through thousands of images is onerous, not to mention time consuming and expensive.

Some methods address this problem by selecting the images based on non-image based. characteristics, such as the date or title accompanying the images. But selecting the images to display to the customer using such methods often does not result in selecting the single image (or image set) that best depicts the item.

SUMMARY

Systems and methods for collecting, selecting, and displaying an image or image set in a network based environment are disclosed. The systems and methods can collect multiple images for any given item from multiple sources, select a desired image (or set of images) that best depicts that item, and then cause the selected image (or image set) to be displayed in the network based environment. The desired image (or image set) that best depicts the item can be selected using any number or combination of pre-selected criteria. By using the pre-selected criteria, the process needs no manual intervention, and can therefore be automated or semi-automated to save both time and cost.

BRIEF DESCRIPTION OF THE DRAWINGS

The following description can be better understood in light of the Figures, in which.

Figure 1:
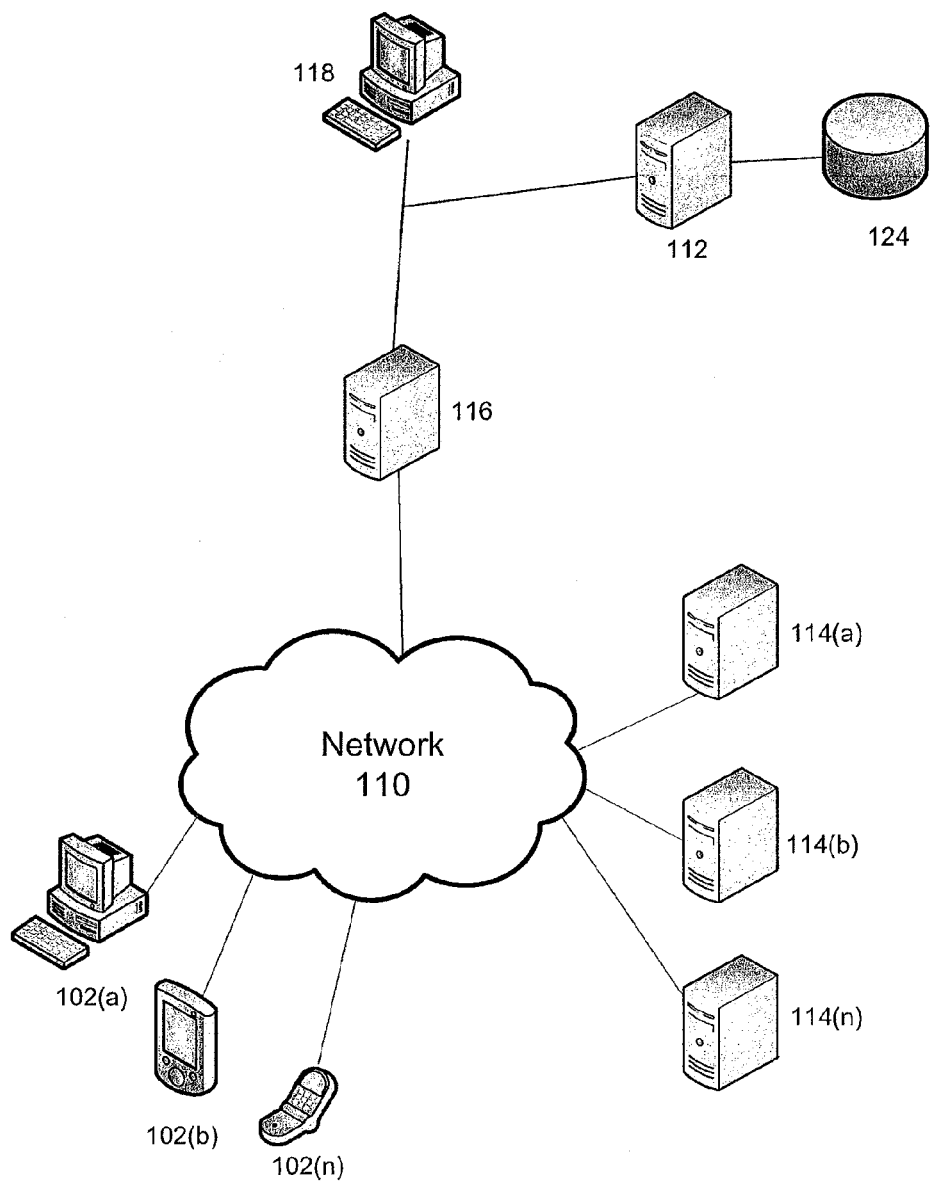
FIG. 1 contains a diagram illustrating a sample system for collecting, selecting, and displaying an image.

Together with the following description, the Figures demonstrate and explain the principles of the systems and methods for collecting, selecting, and displaying an image or image set in a network based environment. In the Figures, the size and configuration of components may be exaggerated for clarity. The same reference numerals in different Figures represent the same component.

DETAILED DESCRIPTION

The following description supplies specific details in order to provide a thorough understanding. Nevertheless, the skilled artisan would understand that the systems and associated methods of using the systems can be implemented and used without employing these specific details. Indeed, the systems and associated methods can be placed into practice by modifying the illustrated systems and methods and can be used in conjunction with any apparatus and techniques conventionally used in the industry. For example, while the description below focuses on systems and methods for selecting an image to display in a network-based environment for electronic commerce, it can be implemented in many other end uses, such as brick and mortar retailers that have a computerized means for shopping, whether via a network or within the stores themselves, as well as in non-electronic commerce applications.

FIG. 1 contains a pictorial diagram of a sample system 100 for collecting, selecting, and displaying an image or image set in a network environment. In FIG. 1, the system 100 contains an imaging server 116 that facilitates a customer viewing images on any number or combination of customer devices 102(a) . . . 102(n). The images are collected from any number or combination of sources 114(a) . . . 114(n), stored in a data store 124, and analyzed in an image information server 112. The system 100 also contains a back-end interface 118 for an operator or administrator to administer the system as known in the art.

Prior to discussing the details of system 100, it should be understood that the following description is presented largely in terms of steps and operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via any known communication links, such as those illustrated in FIG. 1. The system 100 could equally operate within a computer system having a fewer or greater number of components than those illustrated in FIG. 1. Thus, the depiction of system 100 should be taken as illustrative and not limiting. For example, the system 100 could implement various services components and peer-to-peer network configurations to implement at least a portion of the processes.

The system 100 contains a computer network 110 for connecting all the components. Computer networks are well known in the field of communications. Computer networks may include communication links that extend over a local area or a wide area, or even be global, as in the case of computer networks forming the Internet. In some embodiments, computer network 110 comprises the Internet. Protocols and components for communicating via such networks and the Internet are well known to those skilled in the art of computer communications and, thus, need not be described in more detail herein. Those skilled in the art will recognize that other interactive environments that include local or wide area networks that connect users and data stores can be used in the system 100.

The customer devices that can be used in the system 100 can be any computing device that are capable of communicating over computer network 110. Examples of such computing devices include set-top boxes, personal digital assistants, wireless telephones, media players, web pads, electronic book readers, tablets, laptop computers, desktop computers, or combinations thereof. In FIG. 1, the illustrated customer devices are depicted as a personal computer 102(a), a personal digital assistant (PDA) 102(b), and a wireless telephone 102(n).

The imaging server 116 is generally responsible for providing front-end communication with the customer devices. This communication may include generating text and/or graphics, possibly organized as an interface using hypertext transfer or other protocols in response to information inquiries received from the various customer devices. The imaging server 116 may also obtain information about any image(s) from the imaging information server 112 and display that information to the customer devices. For example, the imaging server 116 may obtain information about an image which best depicts an item that a customer is looking to purchase and then display that image on the PDA 102(b).

The image information server 112 that contains data about the various images available. The data contained in server 112 includes all of these images, as well as the various sources (collectively, 114(a) . . . 114(n)) that have provided those images. The data contained in server 112 can also store any desired information that is related to the images themselves, such as any metadata that is associated with an image. The image information server 112 can be updated in real time and may report a real time inventory of the various images, image sources, and related information.

As shown in FIG. 1, the image information server 112 can obtain images from any number of sources 114. Those sources can include any entity that provides any image about any item. Typically, those sources include sellers that are offering various items for sale that can be purchased by the customer. These sources can also include sellers of the images themselves, rather than an item depicted by the images. One example of such sellers would include photographers.

The image information server 112 in system 100 is generally responsible for maintaining any number or combination of rules (or criteria) for comparing images and for selecting a single image or image set to display. These rules (or criteria) may be maintained in any conventional data store in one or more memory storage devices within the image information server 112. These rules (or criteria) are used to select a best image (or images) for display, with a best image (or images) being that image(s) which is optimized for its intended use. The image information server 112 can be updated in real time and may report real time information about the number or combination of such rules.

The data store 124 stores the images and any desired data about the images. The images would include any multimedia file or digital file in any format, including two dimensional standard images, three dimensional images, sounds, and videos (as well along with the accompanying codecs). The images may be stored in compressed and/or uncompressed states. Video images may be clipped or divided into smaller components as needed or desired in consideration of network resources.

The systems described above can be used to carry out many methods for collecting, selecting, and displaying an image or image set in a network based environment. For example, the systems described above can collect multiple images for any given item from multiple sources, select a single image (or set of images) that best depicts that item, and then display that best image (or image set). An image set may comprise only a single image or a plurality of images. The image can be displayed in any type of user interface (UI), including a VI presented to an operator of the system or to a customer looking to purchase an item.

Figure 2:
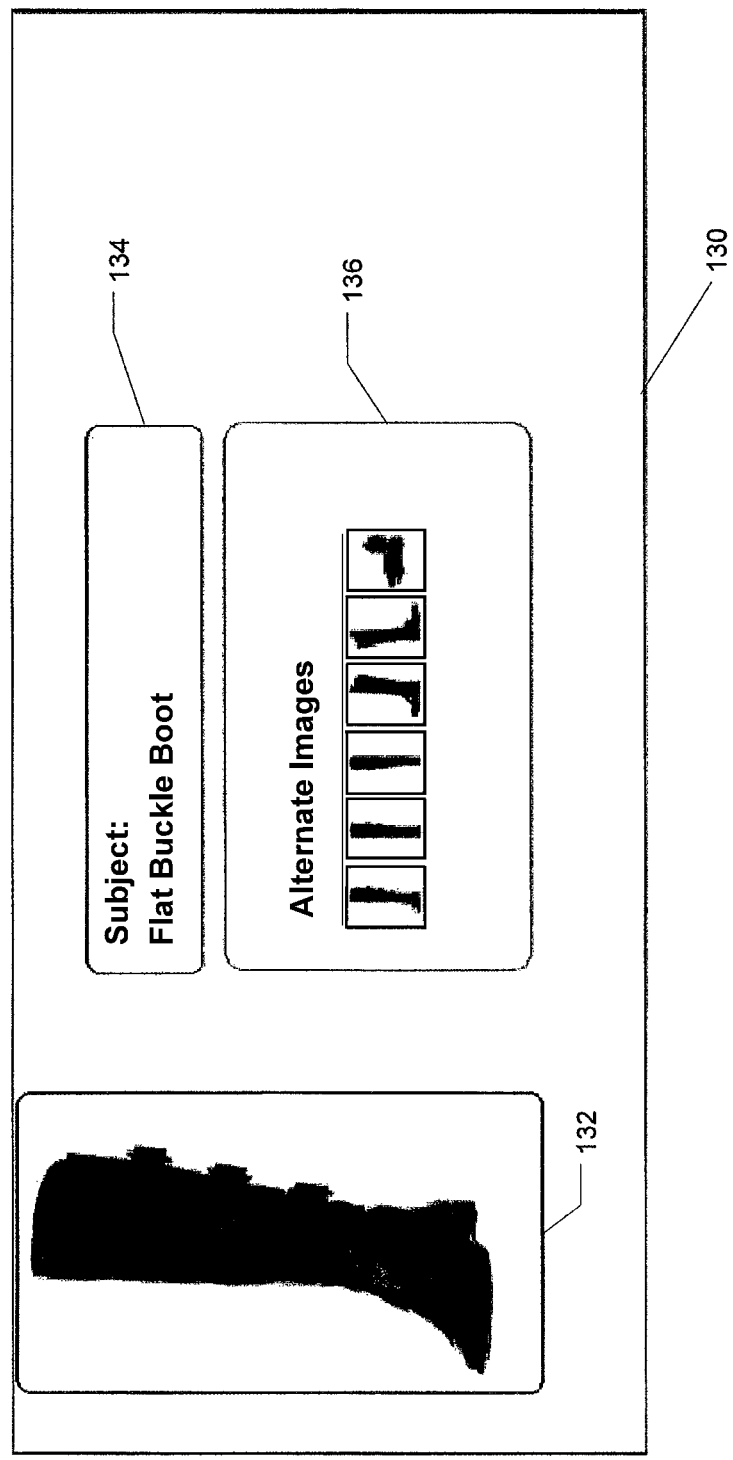
FIG. 2 contains a representation of a sample operator interface for collecting, selecting, and displaying an image.

FIG. 2 illustrates one example of a VI that may be presented by the system to an operator. The UI in FIG. 2 depicts images of a fashionable woman's boot, but any item could be displayed by the UI. The VI 130 comprises a primary view area 132 for viewing the image or images returned by the imaging server. The VI 130 also contains a text portion 134, which is an area for a textual description or textual input. In FIG. 2, the subject of the image in the primary viewing area 132 is textually described in the text portion 134. In some instances, the VI 130 may contain alternate viewing areas 136, which are areas containing images different from the image in the primary view area. The skilled artisan would understand that the shapes and sizes of the various components in UI 130 could be changed as needed.

To be displayed in a UI (such as that depicted in FIG. 2), the image(s) must be scored and then the desired image(s) for display must be selected. One example of a method for scoring the image(s) includes the exemplary method 150 illustrated in FIG. 3. Although the method 150 in FIG. 3 will be discussed in successive steps, it may be done in alternate orders and should not be understood as having to be performed in the described order below. A method of fewer or more steps than those depicted may also be used.

Figure 3:
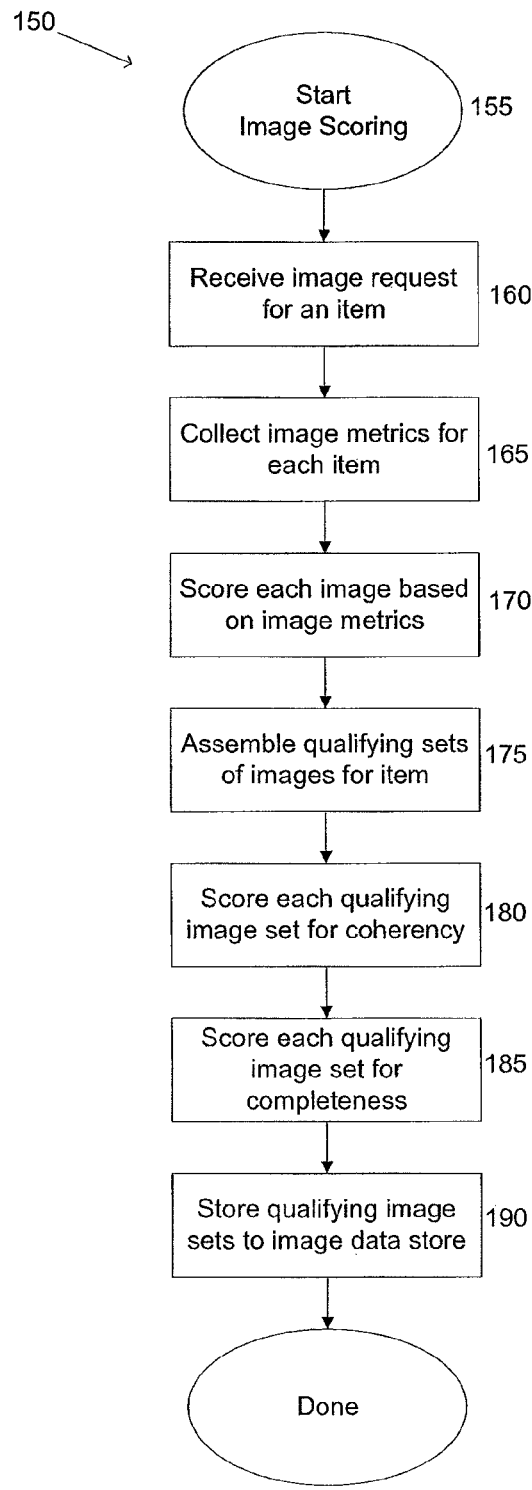
FIG. 3 contains a flow diagram illustrating a sample method for scoring an image.

As depicted in FIG. 3, the method 150 begins in block 155 when the image scoring is initiated by the image information server 112. The method 150 continues in block 160 when an image request for an item is received. The request can be received by either the operator who is analyzing a particular item or a customer who is looking to purchase a particular item. After the request is received, the image metrics for each item are collected in block 165. The items can be collected from any source that can provide any type of image for the item. In most instances, those sources are sellers of the item that is under consideration. But they can include any source that can provide the item in any form, including sellers of the images themselves rather than sellers of items represented by the images. The images that are collected can be any view of the item under consideration. In some instances, the image might be a single view of an item or multiple views of the same item. In other instances, the image can be a series (or set) of views of an item. In yet other instances, the image can be a view of multiples items, such as several components that can be sold separately or that can be packaged together and sold as a single item. In still other instances, the images can be views of specific parts or aspects of the item.

The images that are collected can be isolated or can have other information associated with them. When isolated, only the image itself is collected. In most instances, though, the images will have other information associated with it. For example, an image might have text (such as a title) associated with it. As another example, the image may have other non-image information (other than text) associated with it. As yet another example, the image may have metadata associated with it. Any known metadata can be associated with the image, including J merchant information (i.e., a merchant rating), digital rights management restrictions, and/or customer information (i.e., a customer rating).

The images that are collected can depict just the item itself. As well, the image can depict the item in some type of context. For example, the image could display the item (clothing) and how it is typically used (being worn on a person or on a mannequin). As another example, the image can depict the item (a piece of art) as it would normally be displayed (in an art gallery). As well, the item could be displayed in any type of desired background or environment.

The collection of images need not be a complete collection of every available image from. every available source. In some embodiments, the collection could be merely a category or subset of images. The subset of images could be, for example, from a selected seller or a favorite image source.

After the image metrics have been collected in block 165, each image is scored in block 170 using the metrics. The scoring of the metrics is the process, either automatic or manual, of selecting and ranking the images. In some instances, the scoring process determines which image is best given the available metrics. In the some embodiments, a predetermined metric (such as a score for the image assigned by the source from which the image is obtained) may be selected and then matched to the image. In other embodiments, though, algorithms can be used to provide the metrics for scoring the images. The images can be judged against any number or combination of metrics that are designed to find the best image or image set for a particular item.

In some instances, the metrics themselves are scored before they are used to score the images. The scoring of the metrics is the process, either automatic or manual, of selecting and ranking the metrics using any number or combination of criteria. In the most embodiments, a predetermined criterion may be selected and then matched to a metric. In other embodiments, algorithms provide the basis for selecting the metrics. In some instances, the criteria are preselected so that little to no manual intervention is needed in the selection process. In other instances, though, the criteria are selected manually or on a semi-automated basis. For example, the metrics can be evaluated for any reason, including determining whether they are working and selecting the desired image or best image.

The number and types of metrics used to select the desired image will depend on many parameters, including the type of item and the specific image desired. The number and types of metrics used, while theoretically unlimited, are most often constrained by the time and effort whether manual or automatically-needed to perform the selection process.

The scoring block 170 could include a procedure for classifying or categorizing the images. In some embodiments, this categorization procedure would simplify the scoring performed in block 170 process by requiring that only a certain category of images needed to be analyzed for selection. For example, where the desired image is actually a set of images showing all possible views of an item, categorizing all images as an image set, or not an image set, would allow the selection process to only be performed on those images that are part of an image sets.

The scoring performed in block 170 can be based on any desired number or combination of metrics. The actual metrics can be either objective or subjective, whether they are subjective to the customer or subjective to the operator. One example of the metrics that can be used include those related to the quality of the image, such as the number of pixels, the size of the image file, the size of the actual image (small, medium, large, etc. . . . ), the granularity, and the like. Other examples of the metrics include the characteristics of the actual image, such as the shape of the image (square, circular, oval, polygonal, etc. . . . ), the hue, the color or colors of the image, and the like. Yet other examples of the metrics include the information associated with the image, such as the metadata, merchant scoring, digital rights management (DRM) restrictions, the originating source, and the like.

These metrics can be combined and considered in any desired manner in block 170. As well, the metrics can be ranked in any desired manner so that some metrics are given more importance than others. As well, there can be any trade-off (or scaling system) of the metrics that can be used. For example, the scoring can have a trade-off between the coherence and the completeness in selecting the desired image (as described in detail below).

In some embodiments, the metrics are pre-selected so that no manual intervention is needed. In these embodiments, the metrics can also be automatically ranked so that the scoring is automated and the ranking system automatically ranks the images based on the ranked metrics. This automatic ranking can be very advantageous because the scoring in block 170 can be automated or semi-automated, thereby allowing it to be carried out on a real time (or substantial real time) basis.

Once the scoring in block 170 has been performed, an image set is assembled in block 175. That image set is assembled once the desired image has been determined to qualify under the scoring that has been performed in block 170 using the desired metric(s).

The assembled image sets can then optionally be checked for coherency as shown in block 180. The coherence measures the ability of the image or image set to accurately portray the item. The coherence can be measured as a range or a grade of accuracy. The coherency may take any form depending only on the criteria used to determine whether the portrayal is accurate. For example, if the item represented by the image is a black shirt, the criteria selected may be the color of the image. In this example, coherence of the image set can be measured by determining whether the color of the shirt is depicted as grey or black. If the color is displayed as grey (when the item is black), the image set has failed the coherence check.

The assembled image set can also be optionally checked for completeness in block 185. A complete image set may be dependent on the subject matter of the images or the images themselves. In some instances, the completeness may be judged as whether a set of images includes all pertinent views of the item for sale. In other instances, the completeness of the image can be judged on the degree to which the image shows the desired part(s) or attribute(s) of item, or even the degree to which the entirety of the item is depicted by the image.

Once the qualifying image sets are determined by the image information server, those sets are then stored in a data store, such as data store 124 of system 100, in block 190. The image information server 112 can then retrieve the qualifying image sets from the data store 124 whenever requested, i.e., when requested by the image server 116.

Figure 4:
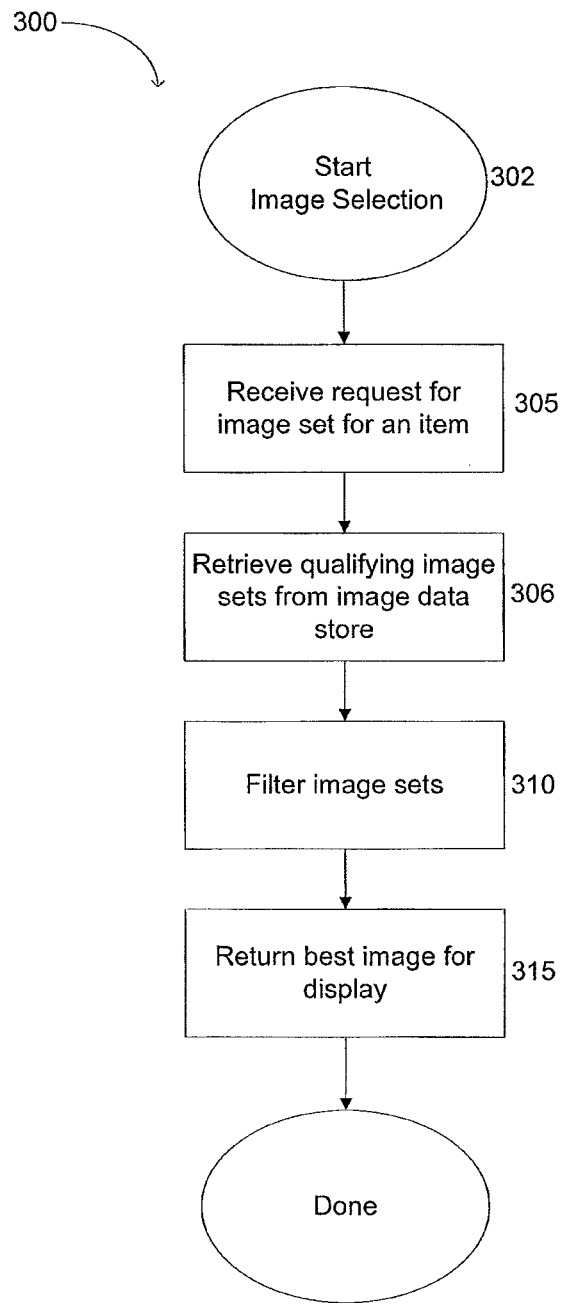
FIG. 4 contains a flow diagram illustrating a sample method for selecting an image for display.

After the image(s) have been scored using the above methods, they can then be selected for display. One exemplary method for image selection (including optimization for the best image that depicts an item) is depicted as method 300 in FIG. 4. Although the exemplary method 300 in FIG. 4 will be discussed in successive steps, it may be done in alternate orders and should not be understood as having to be performed in the described order. A method of fewer or more steps than those depicted may also be used.

The image selection method 300 begins in block 302 when the image selection is initiated by the image server 116. The image server 116 can be triggered automatically when a customer requests a desired item. The imaging server 116 can be also triggered manually by the operator.

The image selection method 300 continues in block 305 when a request for an image set is received by the imaging server 116. That request can originate from the customer when the customer selects a desired item for purchase. As well, that request can originate from the operator when the operator triggers the imaging server 116 manually.

The method 300 continues in block 306 where the available image sets are retrieved. The image sets can be retrieved from a data store that is internal to the system 100 (i.e., data store 124) or from an external data store. As an example of an external data store, individual sources (114(a) . . . 114(n)) can submit electronic catalogs of images. The catalog may contain information about both the quality and non-quality aspects of images for the items available from that source, as well as any other information about the source. When the image set is retrieved from data store 124, it is performed by the image information server 112.

Next, the image sets that have been retrieved are then filtered, as shown in block 310. In block 310, the filter(s) is selected and then used to screen for the desired image, such as an optimal image (or image set) that best depicts the item. The filter(s) used in block 310 can be anyone or combination of metrics or image selection criteria described above, including completeness, ranking, image type, etc.

In some instances, block 310 can be performed by parsing the metadata headers. This parsing of the headers can be accomplished by stepping through the metadata, discarding the data not desired, and saving the desired data. Alternatively, each source may present the metadata in a form that is immediately accessible and useable in this step. Under either method, the result is a comparable data set that can directly be run against the filter(s).

In other instances, block 310 can be performed by applying the filter(s) using any form of automatic or manual comparison process. In these instances, the image data (whether metadata or subject matter data) is compared to the filter on an image by image (or image set by image set) basis. This comparison can either be done manually using a person to perform the comparison, or automatically where the image server 116 performs the comparison, e.g., using an algorithm. In light of these options, block 310 may contain a control setting that allows the automatic or manual method, or some hybrid of the two, to be selected and performed.

As an example of the automatic comparison, the operator may want images of red flowers. Images of flower image data sets would then be retrieved from the data store 124 by the image information server 112 and presented to image server 116. The image server 116 would then parse through the image set looking for images that are predominantly red. The image server 116 would then access any given image and analyze all the red pixels in the image, or portion of the picture, and store the pixel count in a data set. If desired, a second (or third or fourth) criterion could be used for further refinement by, for example, limiting the hue of red in each image or by requiring that over 50% percent of the pixels in the image must be red. For the latter criteria, the image server 116 could divide the red pixels by total pixels present in the images and then list the ratio in the data set.

The manual comparison can be especially useful because some image characteristics lend themselves to manual review because they are less quantifiable, or are even subjective characteristics. Examples of these characteristics include whether the image is in focus, whether the image contains the desired view(s), whether the image is accurate, and the like. By manually choosing to compare the images, the control of aspects that are subjective (or less quantifiable) can be maintained. Indeed, it would take considerable programming effort and potential use of artificial intelligence (AI) to perform some tasks that are very simple for a person to perform. The manual input needed for the manual selection can be performed by the operator of the system, a customer, or even personnel external to the system (i.e., on a contractual basis). The manual input in the selection process can then be combined with other automatic input and used to perform the manual comparison in block 310.

Once the image set is assembled and filtered, the method 300 may return the best image for display to a user (whether an operator or a customer), as shown in block 315. That best image is then stored in the data store 124 where it can be recalled at any time by the image server 116 to be displayed.

The purpose of the image selection method 300 is to provide a best image to display. The best image can then optionally be displayed in any type of user interface (VI), including a UI presented to an operator, or to a customer looking to purchase an item using the image. An example for displaying the best image in an operator UI is depicted in FIG. 2. The VI for a user could also contain any other known components, such as allowing the operator to manually swap the displayed image for any other image and an option for the operator to change the metrics used to select the desired image.

Figure 5:
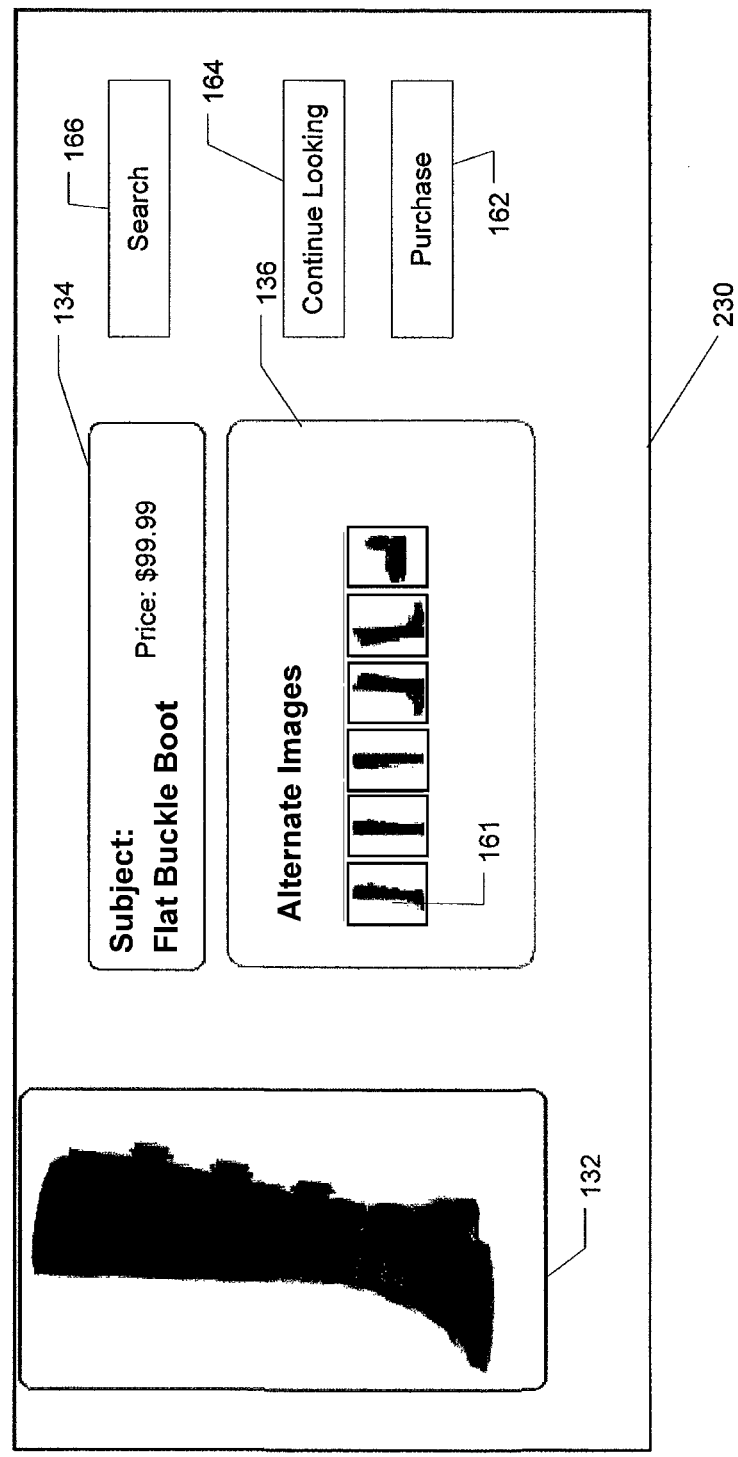
FIG. 5 contains a representation of a sample customer interface for viewing an image.

An example of a VI for a customer is depicted in FIG. 5. In FIG. 5, the customer UI 230 contains similar components as the operator VI depicted in FIG. 2. But the customer UI could also contain a price ($99.99) in the text portion 134, as well as fields 161; 164, 162, and 166 for the customer. These fields may be in selectable thumbnail 161 that, when selected, exchanges that image in the alternate viewing area with the image in the primary viewing area 132. The customer VI can provide fields for purchasing 162 an item for which a desired image is displayed, or could provide options for selecting a different item 164. Additionally, alternate or refining search criteria can be provided by search field 166. The VI for a customer may contain any other known components, such as an option for the customer to select preferred display criteria.

The customer UI and/or the operator UI can contain options about the image being displayed and what other processes can be performed on-or with-the image. In some embodiments, the options can allow the image to be manipulated, for example, to rotate views of the item provided by an image set. In other embodiments, however, the UI merely allows the displayed image to be viewed and no additional options can be displayed. As well, the number of images to be displayed in the UI can be changed or otherwise modified.

In some embodiments, the customer UI and/or the operator VI can contain a number of different images that can be displayed in the UI, along with the underlying criteria that lead to the selection of any given image of those displayed. If too many images are selected in these embodiments, an additional response query may be made for further criteria in order to return a more manageable result of images. This step may be repeated until a desired image or image set is found.

Figure 6:
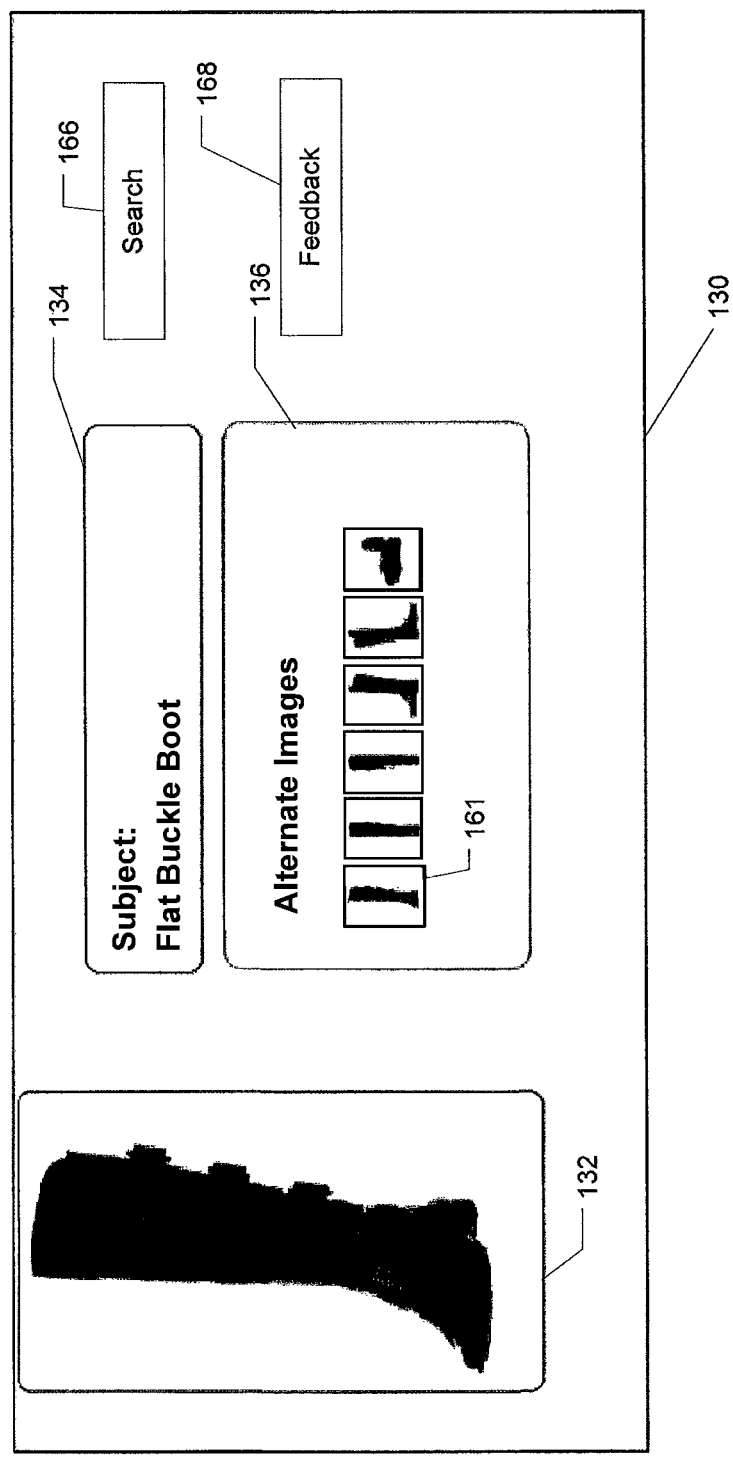
FIG. 6 contains a representation of a sample user interface that contains a feedback option.

Both the image scoring method 150 (illustrated in FIG. 3) and the image selection method 300 (illustrated in FIG. 4) can contain an optional feedback loop(s). The feedback loop(s) allows the methods, including any individual part, to be improved on using any feedback. One example of such feedback can be the manual feedback about the desired image provided by manual input. Another example of such feedback could be the feedback provided by a customer through, for example, a comment about the selected image or the image selection process. Another example of the feedback could include data about how often (or how little) a selected image for an item is viewed and/or used, for example, in a purchase by a customer. The feedback can be incorporated into the VI by inserting an appropriate field into the VI, such as field 168 that has been added to the operator VI 130, as depicted in FIG. 6.

Figure 7:
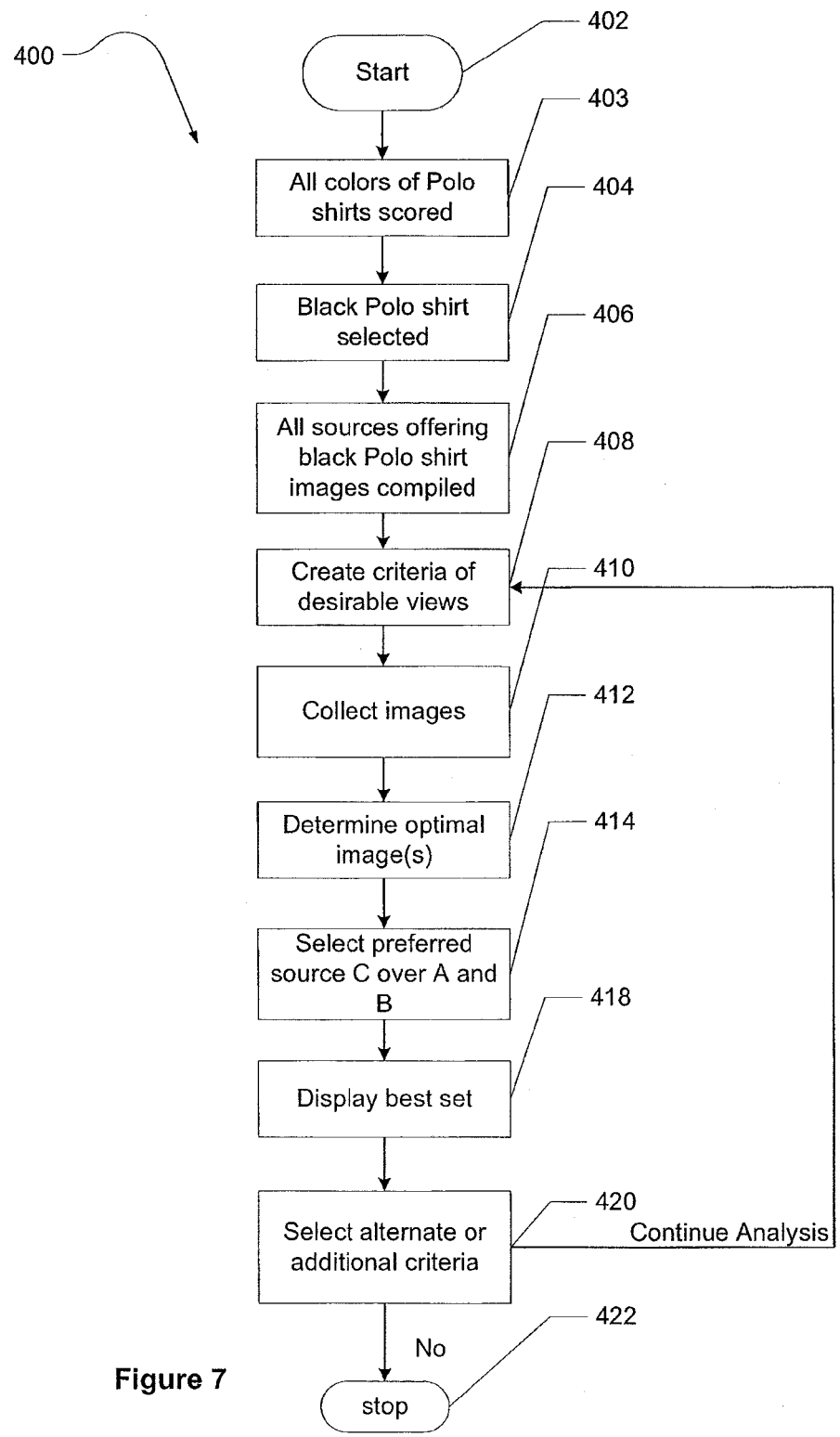
FIG. 7 contains a flow diagram illustrating a sample method used to select an image for a specific item.

FIG. 7 illustrates an example of how the above systems and methods can be used by an operator (or administrator) to select a specific image for a given item before that item is offered for sale to a customer. FIG. 7 contains a flow chart depicting a method 400 for finding an image for a black Polo brand T-shirt that will be displayed to a customer. The method 400 begins at block 402 when the image server 116 starts by being triggered manually by the operator.

The method 400 continues in block 403 when all colors of Polo brand T-shirts can be scored since the operator knows that the item of interest is a black Polo brand T-shirt. The method continues in block 404 when the item of interest (a black Polo brand T-shirt) is selected by the operator from among all of the colors of the Polo brand T-shirts that have been scored in block 403. Next, a data set of image sources (including sellers or suppliers) that have at least one image of a black Polo brand T-shirt can be compiled in block 406. In this method 400, those image sources will most likely comprise any seller that is offering a black Polo brand T-shirt for sale to a customer.

The method 400 continues when the operator enters the desired metrics or criteria for the images of a black Polo brand T-shirt in block 408. The operator will, of course, seek an image that best appeals to customers and so will select those metrics or criteria that, when used, will select the most appealing black Polo brand T-shirt. For example, the operator may select one of the criteria to be that the image has a white background since that will best show the black color of the Polo brand T-shirt.

A data set of all the images for black Polo brand T-shirts by all the sources is then collected in block 410. This data set can be collected automatically from any of the available image sources compiled in block 406. The data set can then be organized in any manner known in the art, including organizing by the file size or resolution of the image files.

A best or optimal image (or set of images) for the black Polo T-shirt is then selected for display in block 412. The optimal image can be selected by comparing the criteria from block 408 that have been collected. An example of an optimal image (or image set) could include only an image set where all of the images have a white background (since that criteria was selected as an example for block 408). Another example could be a black Polo T-shirt that is shown as being worn on a model, and a complete set of images showing all views of that specific black Polo T-shirt.

Optionally, a preference can be given to a given image that is provided from a specific source, as shown at block 414. For example, source C could be manually chosen over source A and B because of a contractual arrangement or because of the previous quality of images provided by source C. As well, source C could be automatically given preference because source C could have more images of black Polo T-shirts in the data set(s) than sources A or B. Any other reason known in the art for preferring one source over another could also be used.

In block 418, the best image set is displayed in a VI. The VI may include an area for the selected image of the black Polo T-shirt and secondary areas for related or alternative images, as described above. The operator's selection of different options in block 420 determines whether the method 400 proceeds or stops. In one option, the operator can further refine the image process by adding more criteria, subtracting criteria, replacing criteria, or selecting different criteria. When this option is selected by the operator, the method 400 is returned to block 408 to proceed forward based on the change in criteria.

The method 400 may be stopped in block 422 when the operator is satisfied that the image displayed is the best image for black Polo T-shirt. But the method 400 may be stopped during any of the steps listed above and may be restarted at any point in the process depending on the actions of the operator.

Figure 8:
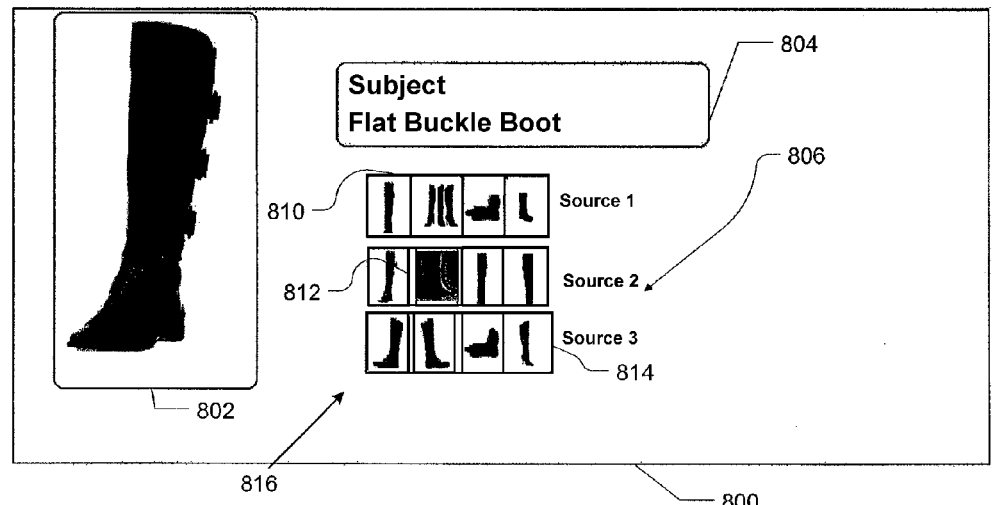
FIG. 8 contains a representation of a sample operation interface for collecting and selecting a desired image for display in a network environment.
Figure 9:
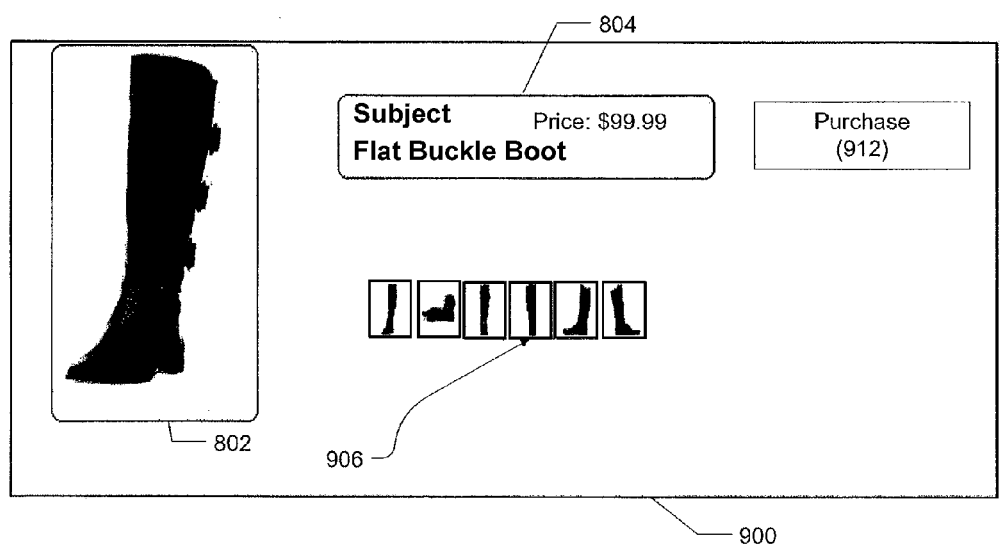
FIG. 9 contains a representation of a customer interface for viewing a desired image that has been displayed in a network environment.

FIGS. 8 and 9 illustrate how an operator can use the VI to choose the best image set from the various images that have been collected from the various sources. FIG. 8 shows an initial collection of images which can be displayed to the operator in an operator UI. Using the systems and methods described above, the operator can select a best image set which is then displayed to a customer in the customer VI shown in FIG. 9. The UIs in FIG. 8 and FIG. 9 can be displayed in any network resource of the system 100, such as a web page or as a standalone display.

Similar to the UIs described above, FIG. 8 depicts a VI containing a selected image (and/or image set), but displayed in the context of a web page 800. The web page 800 displays the results of the collection of the images from three different vendors. The vendors (sources 1, 2, and 3) are displayed in the sources section 806 of the web page 800. The web page 800 also contains a primary image section 802 where the selected image can be displayed. Additionally, the web page 800 may contain a textual description area 804. If desired, the web page 800 could also contain any of the fields and components described above.

The primary image section 802 displays an image (or image set) selected by the image' sever 116. If desired, the primary image section 802 may include a hypertext link to further pages containing detailed information about that image that is currently shown. As well, the primary image section 802 can contain information about the criteria that have been used to select the primary image.

The web page 800 also contains an additional image section 816. The additional section 806 can show alternate images that can represent the selected image but which, for example, were not selected as the best image. In FIG. 8, the selected image displayed in the primary image section 802 might show a black boot. The additional image section 806 may therefore depict alternative images of that black boot or may depict the various secondary images comprising different views (front, back, side, etc. . . . ) of that same boot.

Another part of the web page 800 contains source section 806. The source section 806 depicts the sources for the collected images. A single source may be displayed or, alternately, a plurality or sources may be shown and optionally associated with the image(s) they have provided. Where a single source has been selected as the preferred source, as described above in FIG. 7, this preference can also be reflected in source section 806.

FIG. 8 illustrates the various images that may be returned from several different sources (1, 2, and 3). For example, an image containing a black boot and several other colors of the same boot is shown at 810. Additionally, a boot with a higher heel than desired is shown at 814 and boots of varying color and of different colored backgrounds are shown at 812. The items shown at 810, 812 and 814 each illustrate an image having various features that prevent them from being selected as the best image, e.g., metric and/or coherence problems.

With the information presented in web page 800, the operator can access and trigger the image server 116. The image server 116 then operates as described to select the best image from among all of the images displayed on web page 800. The best image selected can then be optionally approved by the operator using the VI in web page 800.

The best image can then be displayed to the customer by using the VI displayed as part of web page 900. Web page 900 contains the image in primary image section 802, as well as image area 906 which illustrates the best image set containing a complete set of alternate views of the image in section 802. Images 810, 812 and 814 (with undesirable metrics), as well as any duplicate images, have been removed, and are no longer displayed to the customer in web page 900. A purchase price has been added to the text portion 804 and a purchase field has been added for the convenience of the customer.

A limited number of sections are depicted in FIGS. 8 and 9 for purposes of clarity. But additional sections or components, including those described above) may be employed as needed for the convenience of the operator or the customer. For example, additional sections could include the metric ranking, a filter section for pre-screening the images, as well as a verification field for the convenience of the operator. As well, depending on the size and format of the device used by the customer, the VI will take various forms and may have more or fewer sections in order to fit the display of that customer device.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

What is claimed is:

1. A computer-implemented method for selecting a set of images for display, the method comprising:
   receiving, by a computing device, a request to display a product page for a product;
   generating, by the computing device, a first image set by aggregating images of the product from a plurality of sellers of the product based on the image request;
   scoring, by the computing device, individual images of the first image set based on determined scoring criteria, wherein the scoring criteria comprises at least one of pixel analysis criteria, image size criteria, image granularity criteria, or image color criteria;
   ranking, by the computing device, individual images of the first image set based on individual scores associated with the images;
   generating, by the computing device, a second image set from the first image set by selecting one or more images based at least in part on the ranking associated with individual images;
   determining, by the computing device, whether the second image set is complete based, at least in part, on whether each of a defined set of views of the product is represented by at least one image of the second image set, wherein the defined set of views comprises two or more views representing different views of the product;
   based on a determination that each of the defined set of views of the product is represented by at least one image of the second image set, making, by the computing device, the images of the second image set that represent the defined set of views of the product available for display on the product page over a network.

2. The computer-implemented method of claim 1 further comprising automatically displaying the second image set.

3. The computer-implemented method of claim 1 further comprising:
   subsequent to generating the second image set, receiving at least one selection criteria for filtering the second image set;
   creating, by the computing device, a filtered image set of the product by selecting images from the second image set based at least in part on the at least one selection criteria.

4. The computer-implemented method of claim 1 further comprising filtering, by the computing device, images of the first image set prior to scoring the individual images of the first image set to form a filtered image set, wherein only images in the filtered image set are scored.

5. The computer-implemented method of claim 4, wherein creating the filtered image set of the product by selecting images from the first image includes determining whether a background in two or more images depicts a substantially similar color.

6. The computer-implemented method of claim 1 wherein scoring individual images of the first image set based on determined scoring criteria includes identifying, by the computing device, images of the first second image set that portray the product based on an analysis of individual images in the first image set, wherein the analysis is based on at least one attribute of the product included in images of the first image set that portray the product.

7. The computer-implemented method of claim 6, wherein the analysis of at least one attribute of the product includes determining whether more than a threshold number of pixels in one or more images depict a substantially similar color.

8. A computer-implemented system for selecting images for display, the system comprising:
    a data store for storing a plurality of images from multiple sources; and
    a computer processor in communication with said data store that is configured to:
        receive a request to display a product page for a product;
        generate a first image set by retrieving images of the product from multiple sources;
        score individual images of the first image set based on determined scoring criteria, wherein in the scoring criteria comprises at least one of pixel analysis criteria, image size criteria, image granularity criteria, or image color criteria;
        generate a second image set from the first image set by selecting one or more images based on the scores associated with individual images;
        determine whether the second image set is complete based, at least in part, on whether each of a defined set of views of the product is represented by at least one image of the second image set, wherein the defined set of views comprises two or more views that represent different views of the product; and
        based on a determination that each of the defined set of views of the product is represented by at least one image of the second image set, make the images of the second image set that represent the defined set of views of the product available for display on the product over a network.

9. The computer-implemented system of claim 8, wherein the computer processor is further configured to automatically collect criteria for scoring the first image set and rank the collected criteria before using the criteria to score the first image set.

10. The computer-implemented system of claim 8 further configured to rank images of the first image set based, at least in part, on the scores assigned to images of the first image set before generating the second image set.

11. The computer-implemented system of claim 8 further configured to determine whether images of the first second image set portray the product based on an the analysis of at least one attribute of the product, wherein the analysis includes determining whether more than a threshold number of pixels in one or more images depict a substantially similar color.

12. The computer-implemented system of claim 8, wherein the second image set includes a primary image and a plurality of secondary images.

13. A non-transitory computer-readable medium containing computer executable code for selecting images to display, wherein the computer executable code when executed by a computing apparatus causes the computing apparatus to:
    receive a request to display a product page for a product;
    generate a first image set by aggregating images of the product from a plurality of sources of the product based on the image request;
    score individual images of the first image set based on determined scoring criteria;
    generate a second image set from the first image set by selecting one or more images based on the ranking associated with individual images;
    determine whether the second image set is complete based, at least in part, on whether each of a defined set of views of the product is represented by at least one image of the second image set, wherein the defined set of views comprises two or more views that represent different views of the product; and
    based on a determination that each of the defined set of views of the product is represented by at least one image of the second image set, make the images of the second image set that represent the defined set of views of the product available for display on the product page over a network.

14. The computer readable medium of claim 13, wherein the computer executable code further causes the computing apparatus to automatically display the second image set.

15. The computer readable medium of claim 13, wherein the computer executable code further causes the computing apparatus to determine whether a background in two or more images depict a substantially similar color.

16. The computer readable medium of claim 13, wherein the determined scoring criteria includes at least one of pixel analysis criteria, size criteria, granularity criteria, or color criteria.

17. The computer readable medium of claim 13, wherein the computer executable code further causes the computing apparatus to rank images of the first image set based, at least in part, on the scores assigned to images of the first image set before generating the second image set.

18. The computer readable medium of claim 13, wherein the computer executable code further causes the computing apparatus to determine whether images of the second image set portray the product based on an the analysis of at least one attribute of the product, wherein the analysis includes determining whether more than a threshold number of pixels in one or more images depict a substantially similar color.

19. The computer readable medium of claim 13, wherein generate a second image set from the first image set includes determining a primary image and a plurality of secondary images.

20. The computer readable medium of claim 19, wherein the plurality of secondary images depict two or more perspectives including at least one of a top view, a front view, or a side view of the product.

* * * * *